United States Patent
Gringel et al.

(10) Patent No.: US 10,105,900 B2
(45) Date of Patent: Oct. 23, 2018

(54) COATING UNIT

(71) Applicant: Homag Holzbearbeitungssysteme GmbH, Schopfloch (DE)

(72) Inventors: Martin Gringel, Strassberg (DE); Johannes Schmid, Starzach (DE)

(73) Assignee: HOMAG HOLZBEARBEITUNGSSYSTEME GMBH, Schopfloch (DE)

( * ) Notice: Subject to any disclaimer, the term of this patent is extended or adjusted under 35 U.S.C. 154(b) by 18 days.

(21) Appl. No.: 14/911,309

(22) PCT Filed: Aug. 13, 2014

(86) PCT No.: PCT/EP2014/067328
§ 371 (c)(1),
(2) Date: Feb. 10, 2016

(87) PCT Pub. No.: WO2015/022362
PCT Pub. Date: Feb. 19, 2015

(65) Prior Publication Data
US 2016/0200036 A1    Jul. 14, 2016

(30) Foreign Application Priority Data
Aug. 14, 2013  (DE) .......................... 10 2013 216 113

(51) Int. Cl.
*B29C 65/52*   (2006.01)
*B27D 5/00*    (2006.01)
*B29L 9/00*    (2006.01)

(52) U.S. Cl.
CPC .............. *B29C 65/52* (2013.01); *B27D 5/003* (2013.01); *B29L 2009/00* (2013.01)

(58) Field of Classification Search
None
See application file for complete search history.

(56) References Cited

U.S. PATENT DOCUMENTS 2,118,763 A    5/1938  Mason
3,429,055 A    2/1969  Bergh
(Continued)

FOREIGN PATENT DOCUMENTS

DE    19543901 A1    5/1996
DE    19518925 A1    11/1996
(Continued)

OTHER PUBLICATIONS

Summary of ISO 2817 and 2813, International Organization for Standard, (no date available).
(Continued)

Primary Examiner — Jethro M. Pence
(74) Attorney, Agent, or Firm — McDermott Will & Emery LLP

(57) ABSTRACT

A coating unit for a coating machine for coating plate- or strip-shaped workpieces, which contain wood, wood materials, plastic, or the like at least in some sections, with a coating material. The coating unit includes a first interface for accommodating an exchangeable joining-agent processing device and for supplying said exchangeable joining-agent processing device with energy, and a first exchangeable joining-agent processing device that can be coupled to the first interface, which first exchangeable joining-agent processing device has an energy conversion device for converting the energy provided via the interface in order to prepare a joining agent for joining the coating material.

8 Claims, 6 Drawing Sheets

(56) References Cited

U.S. PATENT DOCUMENTS

| | | |
|---|---|---|
| 3,560,297 A | 2/1971 | Back et al. |
| 3,676,283 A | 7/1972 | Kehr et al. |
| 3,701,709 A | 10/1972 | Bianchini |
| 3,811,915 A | 5/1974 | Burrell et al. |
| 3,975,740 A | 8/1976 | Distler et al. |
| 4,017,869 A | 4/1977 | Meyer et al. |
| 4,215,350 A | 7/1980 | Mielke et al. |
| 4,222,812 A | 9/1980 | Duewel |
| 4,378,564 A | 3/1983 | Cross et al. |
| 4,514,742 A | 4/1985 | Suga et al. |
| 4,720,301 A | 1/1988 | Kito et al. |
| 4,739,836 A | 4/1988 | Sewell et al. |
| 4,814,795 A | 3/1989 | Kuester et al. |
| 4,894,262 A | 1/1990 | Heitmanek |
| 5,113,757 A | 5/1992 | Spencer |
| 5,133,822 A | 7/1992 | Fujii et al. |
| 5,331,143 A | 7/1994 | Marom et al. |
| 5,485,685 A | 1/1996 | Hashimoto |
| 5,525,791 A | 6/1996 | Krichever et al. |
| 5,530,537 A | 6/1996 | Thayer |
| 5,581,284 A | 12/1996 | Hermanson |
| 5,607,536 A | 3/1997 | Tikka |
| 5,643,983 A | 7/1997 | Lee |
| 5,622,968 A | 9/1997 | Yamaguchi |
| 5,810,487 A | 9/1998 | Kano et al. |
| 5,824,373 A | 10/1998 | Biller et al. |
| 5,830,529 A | 11/1998 | Ross |
| 5,869,138 A | 2/1999 | Nishibori |
| 5,931,098 A | 8/1999 | Bates |
| 5,935,331 A | 8/1999 | Naka et al. |
| 5,950,382 A | 9/1999 | Martino |
| 5,986,680 A | 11/1999 | Wen et al. |
| 5,997,959 A | 12/1999 | Lebioda |
| 6,053,231 A | 4/2000 | Matsuguchi |
| 6,072,509 A | 6/2000 | Wen et al. |
| 6,092,343 A | 7/2000 | West et al. |
| 6,136,408 A | 10/2000 | Radcliffe et al. |
| 6,174,052 B1 | 1/2001 | Eremity et al. |
| 6,180,172 B1 | 1/2001 | Hasenkamp et al. |
| 6,200,424 B1 | 3/2001 | Saari et al. |
| 6,286,920 B1 | 9/2001 | Ridgway |
| 6,358,220 B1 | 3/2002 | Langen et al. |
| 6,428,871 B1 | 8/2002 | Cozzolino |
| 6,465,046 B1 | 10/2002 | Hansson et al. |
| 6,472,053 B1 | 10/2002 | Hoshino et al. |
| 6,634,729 B1 | 10/2003 | Schuman et al. |
| 6,635,142 B1 | 10/2003 | Stula et al. |
| 6,694,872 B1 | 2/2004 | LaBelle et al. |
| 6,789,876 B2 | 9/2004 | Barclay et al. |
| 6,858,261 B1 | 2/2005 | Bar et al. |
| 6,894,709 B2 | 5/2005 | Pferrer |
| 6,981,767 B2 | 1/2006 | Schmitt et al. |
| 6,998,010 B2 | 2/2006 | Wiley |
| 7,273,651 B1 | 9/2007 | Wilde |
| 7,357,959 B2 | 4/2008 | Bauer |
| 7,553,375 B2 | 6/2009 | Sekiya |
| 7,677,195 B2 | 3/2010 | Lee et al. |
| 7,691,294 B2 | 4/2010 | Chung et al. |
| 7,762,647 B2 | 7/2010 | Mehta et al. |
| 8,197,631 B2 | 6/2012 | Oz |
| 8,328,303 B2 | 12/2012 | Frati |
| 8,721,396 B1 | 5/2014 | Martin et al. |
| 9,149,899 B2 | 10/2015 | Fronius et al. |
| 2001/0003871 A1 | 6/2001 | Patton et al. |
| 2001/0005942 A1 | 7/2001 | Patton et al. |
| 2001/0032554 A1* | 10/2001 | Fritz ............. B41F 16/00 101/33 |
| 2001/0049010 A1 | 12/2001 | Fenzi |
| 2002/0024577 A1 | 2/2002 | Takeya et al. |
| 2002/0033851 A1 | 3/2002 | Waldner et al. |
| 2002/0033865 A1 | 3/2002 | Ishinaga et al. |
| 2002/0061389 A1 | 5/2002 | Brooker et al. |
| 2002/0086114 A1 | 7/2002 | Masden |
| 2002/0160114 A1 | 10/2002 | Cozzolino |
| 2002/0189754 A1 | 12/2002 | Hill |
| 2003/0001304 A1 | 1/2003 | Graf |
| 2003/0020767 A1 | 1/2003 | Saksa |
| 2003/0029938 A1 | 2/2003 | Vogel |
| 2003/0043246 A1 | 3/2003 | Codos |
| 2003/0048343 A1 | 3/2003 | Anderson et al. |
| 2003/0178131 A1 | 9/2003 | Lee |
| 2003/0211251 A1 | 11/2003 | Daniels |
| 2003/0217807 A1 | 11/2003 | Lesmann et al. |
| 2003/0218650 A1 | 11/2003 | Valero |
| 2003/0218663 A1 | 11/2003 | Baxter et al. |
| 2004/0026017 A1 | 2/2004 | Taylor et al. |
| 2004/0028830 A1 | 2/2004 | Bauer |
| 2004/0065406 A1 | 4/2004 | Chen et al. |
| 2004/0087068 A1 | 5/2004 | Yudasaka |
| 2004/0094426 A1 | 5/2004 | Lai |
| 2004/0123966 A1 | 7/2004 | Altman et al. |
| 2004/0141764 A1 | 7/2004 | Runkowske et al. |
| 2004/0250947 A1 | 12/2004 | Phillips et al. |
| 2004/0257398 A1 | 12/2004 | Otsuki |
| 2004/0263544 A1 | 12/2004 | Kojima |
| 2005/0017995 A1 | 1/2005 | Pferrer |
| 2005/0034960 A1 | 2/2005 | Shimamura et al. |
| 2005/0089644 A1 | 4/2005 | Oldorff |
| 2005/0098285 A1 | 5/2005 | Aust et al. |
| 2005/0151820 A1 | 7/2005 | Sirringhaus et al. |
| 2005/0153076 A1 | 7/2005 | Reed et al. |
| 2005/0204593 A1 | 9/2005 | Bilger et al. |
| 2005/0274272 A1 | 12/2005 | Machesky |
| 2005/0279450 A1 | 12/2005 | King |
| 2006/0021535 A1 | 2/2006 | Kaiser |
| 2006/0023018 A1 | 2/2006 | Hatayama |
| 2006/0046326 A1 | 3/2006 | Kok et al. |
| 2006/0075917 A1 | 4/2006 | Edwards |
| 2006/0147635 A1 | 7/2006 | Kawabe |
| 2006/0162650 A1 | 7/2006 | Kido et al. |
| 2006/0228150 A1 | 10/2006 | Hosokawa |
| 2006/0275590 A1 | 12/2006 | Lorenz et al. |
| 2007/0044324 A1 | 3/2007 | Harris |
| 2007/0064030 A1 | 3/2007 | Abergel et al. |
| 2007/0091132 A1 | 4/2007 | Lim |
| 2007/0263043 A1 | 11/2007 | Bradford et al. |
| 2008/0048388 A1 | 2/2008 | Gauss et al. |
| 2008/0094428 A1 | 4/2008 | Otis et al. |
| 2008/0121626 A1 | 5/2008 | Thomas et al. |
| 2008/0151006 A1 | 6/2008 | Nishio et al. |
| 2008/0152819 A1 | 6/2008 | Gauss et al. |
| 2008/0193785 A1 | 8/2008 | Kingma et al. |
| 2008/0239042 A1 | 10/2008 | Gauss et al. |
| 2008/0261021 A1 | 10/2008 | Haenen et al. |
| 2008/0267828 A1 | 10/2008 | Wang et al. |
| 2008/0277022 A1 | 11/2008 | Harms |
| 2008/0277630 A1 | 11/2008 | Kiyoshima et al. |
| 2009/0120249 A1 | 5/2009 | Gauss et al. |
| 2009/0133361 A1 | 5/2009 | Vera |
| 2009/0252933 A1 | 10/2009 | Free et al. |
| 2009/0305009 A1 | 12/2009 | Meersseman et al. |
| 2010/0059176 A1 | 3/2010 | Ito |
| 2010/0062666 A1 | 3/2010 | Siemensmeyer et al. |
| 2010/0075059 A1 | 3/2010 | Nonokawa et al. |
| 2010/0098887 A1 | 4/2010 | Matsuishi et al. |
| 2010/0181691 A1 | 7/2010 | Yoshida |
| 2010/0196674 A1 | 8/2010 | Vanderlip et al. |
| 2010/0227128 A1 | 9/2010 | Kramer et al. |
| 2010/0269971 A1 | 10/2010 | Schmid et al. |
| 2010/0285289 A1 | 11/2010 | Nollet et al. |
| 2010/0291310 A1 | 11/2010 | Hartmann et al. |
| 2011/0017082 A1 | 1/2011 | Castells et al. |
| 2011/0183122 A1 | 7/2011 | Schumacher |
| 2012/0091701 A1 | 4/2012 | Krueger et al. |
| 2013/0008333 A1 | 1/2013 | Peter et al. |
| 2013/0016150 A1 | 1/2013 | Peter et al. |
| 2013/0026247 A1 | 1/2013 | Calla et al. |

FOREIGN PATENT DOCUMENTS

| | | |
|---|---|---|
| DE | 19823195 | 11/1999 |
| DE | 19955575 A1 | 5/2001 |
| DE | 10122573 A1 | 11/2002 |
| DE | 10342723 B4 | 12/2005 |

(56) References Cited

FOREIGN PATENT DOCUMENTS

| | | |
|---|---|---|
| DE | 202006000270 U1 | 4/2006 |
| DE | 102006056010 | 7/2007 |
| DE | 102006021171 A1 | 11/2007 |
| DE | 19742825 B4 | 1/2010 |
| EP | 0095046 A1 | 11/1983 |
| EP | 0494363 A2 | 7/1992 |
| EP | 0743139 A1 | 11/1996 |
| EP | 0761438 A2 | 3/1997 |
| EP | 0993903 A2 | 4/2000 |
| EP | 1225053 A2 | 7/2002 |
| EP | 1068026 B1 | 3/2003 |
| EP | 1435296 A1 | 7/2004 |
| EP | 1479524 A1 | 11/2004 |
| EP | 1555132 A2 | 7/2005 |
| EP | 1714884 A1 | 10/2006 |
| EP | 1716991 A1 | 11/2006 |
| EP | 1726443 A1 | 11/2006 |
| EP | 1800813 A2 | 6/2007 |
| EP | 1852242 A1 | 11/2007 |
| EP | 2110228 A1 | 10/2009 |
| EP | 2332718 A2 | 6/2011 |
| EP | 2502699 A1 | 9/2012 |
| EP | 2397287 B1 | 1/2016 |
| FR | 2601265 | 1/1988 |
| GB | 722485 | 1/1955 |
| GB | 1516562 A | 7/1978 |
| GB | 1546518 A | 5/1979 |
| GB | 2335885 A | 10/1999 |
| JP | 02006164 | 1/1990 |
| JP | 09226226 A | 9/1997 |
| JP | 10157245 | 6/1998 |
| JP | 10226045 | 6/1998 |
| JP | 2006231621 A | 9/2006 |
| WO | 2001048333 | 7/2001 |
| WO | 2004016438 | 2/2004 |
| WO | 2005009735 | 2/2005 |
| WO | 200702135 A1 | 2/2007 |

OTHER PUBLICATIONS

Numerical Investigation of Droplet Impact Spreading in Spray Coating of Paper, Advanced Coating Fundamentals Symposium, (Spring 2003).
Rigid. Merrian-Webster.com Merrian-Webster, n.d. Web. May 19, 2014, <http://www.merriam-webster.com/dictionary/rigid>.
International Search Report dated Oct. 15, 2014 with respect to Int'l Application No. PCT/EP2014/067328.
German Search Report dated Jul. 11, 2014 with respect to DE 10 2013 216 113.1 corresponding to Int'l Application No. PCT/EP2014/067328—cited only for references that are disclosed therein.
International Search Report dated Jun. 21, 2011 with respect to Int'l Application No. PCT/EP2011/052623 a potential related application—cited only for references that are disclosed therein.
German Search Report dated Aug. 4, 2011 with respect to DE 10 2010 008 821.8 corresponding to Int'l Application No. PCT/EP2011/052623 a potential related application—cited only for references that are disclosed therein.

* cited by examiner

COATING UNIT

TECHNICAL FIELD

The present invention relates to a coating unit for coating, in particular, plate- or strip-shaped workpieces which preferably consist, at least in sections, of wood, wood materials, plastic or the like, with a coating material.

PRIOR ART

In the furniture and components industry sectors, there is often a need to coat workpieces consisting, for example, of wood materials such as MDF, particle board or the like with a coating material in the region of their narrow or broad faces. In most cases, the coating materials are glued to the workpiece surfaces, though further joining techniques have emerged.

One joining technique that is being applied is based on the use of a hot melt adhesive, wherein a melting unit melts a bonding agent and generally applies it to the coating material or the workpiece surface to be coated by means of glue application systems in the form of rolls or nozzles. Whilst this joining technique is comparatively cost-efficient, it yields a visible glue line which, for aesthetic reasons, is undesired in certain areas of application.

In addition to the conventional hot melt adhesive joining technology, the so-called zero-bond-line joining technique is also known. In this zero-bond-line technique, the surface to be glued of the coating material, or the workpiece surface to be coated, is coated with a functional layer which develops adhesive properties due to energy input. In this method, the functional layer is generally activated by a laser beam, hot gas or other radiant energy, whereupon the coating material is joined to the workpiece surface to be coated. As compared to the hot melt adhesive joining technology, the zero-bond-line technique normally involves higher manufacturing costs, yet results in a very high-quality coating having clearly greater adhesion, improved moisture resistance, and an optical bond line of zero between edge and board.

However, the units and devices that are known from the prior art have the disadvantage that only one joining technology, for example the hot melt adhesive technology or the zero-bond-line technology, can be provided to the user on one machine. In this regard, the hot melt adhesive technology is still the most economic coating method, whilst the zero-bond-line technology meets the highest quality requirements. Therefore, in order to enable a wide variety of processing options, two machines must nowadays be provided, namely one for the conventional hot melt adhesive technologies and another one for the new zero-bond-line technology.

SUMMARY OF THE INVENTION

Therefore, it is an object of the present invention to provide a flexible coating unit with which different coating technologies can be implemented.

The solution to this object is achieved by the unit of patent claim 1. Preferred embodiments can be seen from the sub-claims.

The invention is based on the idea that the provision of different coating technologies in one coating unit is possible in a simple, cost-efficient and space-saving manner in that a technology-specific means is designed so that it can be exchangeably included and a means which is required for all joining technologies is already provided on the unit. This makes it possible, for example, to provide a joining agent processing means specific to hot melt adhesives when having to join a coating material using the hot melt adhesive technology, and to exchange this, for example, for a laser-beam-specific joining agent processing means when it is required to use a zero-bond-line technology for joining.

The different joining technologies are based on different forms of energy, i.e. the hot melt adhesive technology is based, for example, on thermal energy which is required to melt a hot melt adhesive, whereas, for example, the zero-bond-line technology is based on electromagnetic energy which is required to activate a functional layer by means of electromagnetic radiation.

According to the invention, the problem existing in the prior art is therefore solved by providing a coating unit which includes an interface for accommodating and energizing an exchangeable joining agent processing means and an exchangeable joining agent processing means capable of being coupled to this interface. The joining agent processing means comprises an energy conversion means for converting the energy provided via the interface to process a joining agent for joining the coating material to the workpiece surface to be coated.

The joining agent can, for example, be a hot melt adhesive, in which case processing is then targeted, for example, at melting the hot melt adhesive. Likewise, the joining agent can be a functional layer which is activated, for example, by means of a laser beam or a hot gas, i.e. is processed for joining the coating material.

The interface preferably provides electrical energy which is converted, via an energy conversion means provided on the respective joining agent processing means itself, into a form of energy required for the joining technology. Thus, the electrical energy which is supplied to the exchangeable joining agent processing means via the interface is, for example, converted into electromagnetic energy, namely a laser beam for activating a functional layer, by the energy conversion means for the laser-based zero-bond-line technology which is provided on the joining agent processing means itself. By contrast, the energy conversion means of a hot melt adhesive bonding unit is capable, for example, of converting, on the joining agent processing means itself, the electrical energy provided via the interface into thermal energy for melting a bonding agent.

The coating unit according to the invention thus makes it possible to provide different joining technologies in one unit. This enables great processing variability with correspondingly low overall system costs. Furthermore, the design according to the invention results in a lean and compact system and particularly an interface of simple design, since the means specific to the respective joining technologies are provided on the corresponding joining agent processing means themselves. Thus, it is not required, for example, that all the different forms of energy required for the different joining technologies must be provided via the interface. Furthermore, the coating unit according to the invention is freely expandable since the universally designed interface also allows joining agent processing means to be accommodated which include joining technologies that have yet to be developed in the future.

According to one embodiment, the coating unit includes a second interface for accommodating and energizing an exchangeable joining agent processing means. Providing a second interface makes it possible to simultaneously provide two different joining technologies in one unit without a setup process. This enables increased processing efficiency and thus lower unit costs. Furthermore, the second interface permits longer machine service life since—for example in the event of a defective first interface—the first joining agent processing means can be changed over to the second interface, there being thus no machine downtime.

In a preferred embodiment, the coating unit may also include a second exchangeable joining agent processing means which can be connected to the first and/or second interface and which comprises an energy conversion means for converting the energy provided via the interface to process a joining agent for joining the coating material to the workpiece surface to be coated. This leads to the advantage that different joining technologies can be provided on one machine and/or that a joining agent processing means can be serviced while a corresponding one can be exchanged into the machine. This enables increased processing variability and/or increased machine service life.

A joining agent processing means preferably includes an adhesive reservoir for receiving an adhesive and an application means for applying the adhesive to the coating material and/or the workpiece surface to be coated. Furthermore, the processing unit is preferably adapted to activate the adhesive by means of the energy conversion means of the joining agent processing means prior to application. According to the invention, activation of a joining agent is understood to mean a process which causes the joining agent to develop adhesive properties. Activation according to the invention can thus include, for example, melting or liquefying a bonding agent and/or exciting a functional layer using a laser beam. This design of the joining unit thereby makes it possible to provide the hot melt adhesive technology, which can be used at low cost, on the coating unit.

A joining agent processing means can be adapted to activate a functional layer capable of being activated by energy input for the purpose of joining the coating material to the workpiece surface to be coated. A joining agent processing means thus designed thereby makes it possible to provide the above-described zero-bond-line technology on the coating unit. To do so, the functional layer capable of being activated by energy input is either fed to the joining area between the coating material and the workpiece surface to be coated or is provided on the surface of the workpiece to be coated or on the coating material.

According to one embodiment, the energy conversion means of the first joining agent processing means and/or optionally the second joining agent processing means includes at least one laser diode for generating a laser beam. The energy conversion means preferably further comprises a beam guiding and/or beam shaping means for the laser beam. The laser diode for generating a laser beam thereby makes it possible to effectively activate a hot melt adhesive and/or a functional layer by means of a laser beam. The design according to the invention, in which the laser diode is provided on the joining agent processing means itself, moreover bypasses the requirement of providing complex and cost-intensive beam guiding systems as well as a complex interface in order to direct the laser beam to the activation area.

According to one embodiment, the energy conversion means of the first joining agent processing means and/or second joining agent processing means includes a heating system for generating hot gas. The energy conversion means preferably further comprises a nozzle means for applying the hot gas, for example, to the coating material and/or the surface to be coated. Likewise, the hot gas can be used to preheat the coating material and/or the workpiece surface to be coated. The hot gas constitutes a comparatively cost-effective form of energy. The energy conversion means may have gas supply terminals arranged, for example, on the upper surface thereof. However, it is also conceivable for the gas supply to take place via the interface of the unit.

According to another embodiment, the coating unit includes a pressing member for pressing the coating material against the workpiece surface to be coated. Such a design results in a less complex coating unit having increased energy efficiency since the pressing member is provided in close proximity to the energy conversion means of the respective joining agent processing means. Thus, it is possible to join the coating material to the surface to be coated immediately adjacent to the point where a joining agent, for example a hot melt adhesive, is provided on the coating material or a functional layer is activated. In this way, cooling or drying of the joining agent can be avoided or at least reduced to a minimum.

The coating unit preferably includes a unit interface for exchangeably coupling the unit to a coating machine. Such a design of the unit allows the latter to be connected, for example, to existing coating devices. Furthermore, this ensures simple maintenance and exchangeability of the unit.

Furthermore, the present invention provides a coating device including a coating unit as previously described. The device moreover comprises a feeder for feeding a coating material to the workpiece surface to be coated, a pressing member for pressing the coating material against the workpiece surface to be coated, and a conveyor for causing relative movement between the pressing member and the workpiece surface to be coated. The pressing member of the device can also be provided on the coating unit.

According to one embodiment, the device comprises an exchange means for setting up the coating unit for the first and/or second joining agent processing means and/or for changing the device over to another joining agent processing means. It should be noted that the exchange means may also form part of the coating unit. The exchange means allows the setup and/or changeover processes to be automated and thus the efficiency of the coating device and/or coating unit to be increased. This leads to reduced production time and thus increased output, which results, in turn, in lower unit costs.

DETAILED DESCRIPTION OF PREFERRED EMBODIMENTS

Preferred embodiments of the present invention will now be described with reference to the accompanying drawings. Further alternatives and modifications can in each case be combined with each other to form further embodiments.

The preferred embodiments of the inventive coating unit described below have the purpose of coating, in particular, narrow faces of workpieces with a coating material. The workpieces consist, at least in sections, of wood, wood materials, plastic or the like as are used, for example, in the furniture and components industry sectors. Examples thereof include solid wood boards or particle boards, lightweight boards, sandwich boards or the like.

The coating material preferably is an edge banding which may consist of different materials such as, for example, plastic veneer, paper, cardboard, metal, etc., and a multitude of combinations thereof. The coating material is preferably provided in roll form, but may also be provided, for example, in the form of individual sections. Furthermore, the coating material may have a functional layer which develops adhesive properties due to energy input (for example heating or laser radiation), allowing the coating material to be joined to a workpiece via the functional layer. The functional layer may include means for increasing thermal conductivity such as, for example, polyolefins and/or metal particles. Furthermore, the functional layer may include absorbers for laser light or other sources of radiation. As an alternative, the functional layer may also be separately fed between the coating material and workpiece or may already be provided on the workpiece surface to be coated.

First Preferred Embodiment

Figure 1:
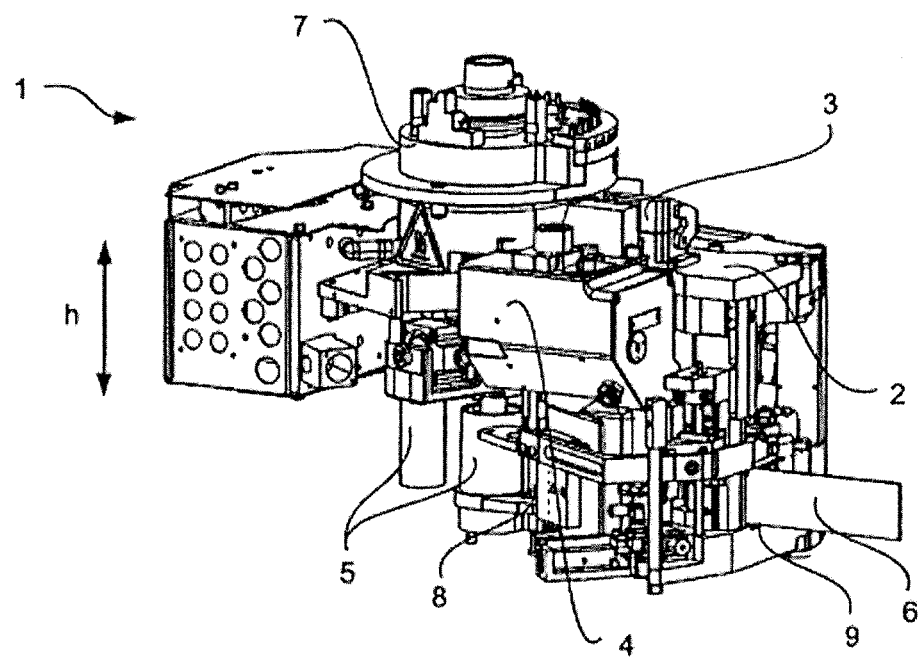
FIG. 1 is a lateral view of the coating unit of a first embodiment of the present invention.
Figure 2:
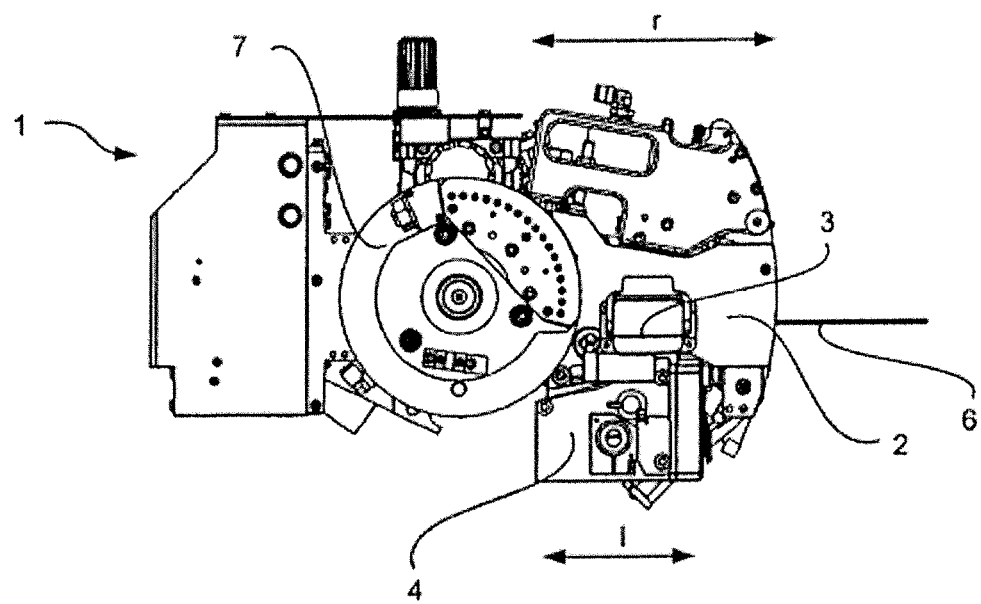
FIG. 2 is a top view of the coating unit of the first embodiment of the present invention.

A first preferred embodiment of a coating unit 1 of the present invention will now be described in detail with reference to FIGS. 1 and 2. The coating unit 1 includes a device carrier 2 having an interface 3 for accommodating and energizing an exchangeable joining agent processing means 4, pressing rolls 5 for pressing the coating material 6, here an edge banding, against the narrow workpiece face to be coated, and a coating unit interface 7.

The coating unit interface 7 makes it possible to couple the coating unit 1 to a coating machine (not shown). The coating unit interface 7 preferably includes terminals for supplying the unit 1 with electrical energy. Likewise, it is possible for the interface 7 to comprise terminals for supplying the coating unit 1 with compressed air, coolant, etc., and/or terminals for controlling the coating unit 1. In the present embodiment, the coating unit 1 is constructed around the coating unit interface 7 and, in the direction of height extension h of the unit 1, below the interface 7.

In this preferred embodiment, the device carrier 2 extends along about 90 degrees around the coating unit interface 7, its radial extension corresponding approximately to twice the maximum diameter of the coating unit interface 7. The device carrier 2 further comprises an edge inlet 9 which, in this preferred embodiment, is arranged approximately centrally in the circumferential extension thereof, at the lower end in the direction of height extension h, and on the outer circumference of the carrier 2. Furthermore, the device carrier 2 preferably comprises two pressing rolls 5 which are arranged, in the direction of height extension h, at the lower end of the device carrier 2 and, in the radial direction, in the region of the coating unit interface 7. The pressing rolls 5 are preferably arranged approximately level with the edge inlet 9. It is also conceivable for only one pressing roll or more than two pressing rolls to be provided. A pressing shoe or any other pressing member with which the coating material 6 can be pressed against the workpiece surface to be coated is, for example, likewise conceivable. An adjustable and/or regulatable pressing member that can be used to adapt the pressing pressure would also be possible here.

In addition, the device carrier 2 includes the interface 3 for accommodating and energizing the joining agent processing means 4. The interface 3 is preferably provided outside the region of the coating unit interface 7, and therefore coupling and uncoupling of the means 4 is not obstructed thereby. The interface 3 is preferably arranged at approximately half the radial extension of the carrier 2 and/or, in the direction of circumferential extension of the carrier 2, level with the edge inlet 9. The interface 3 is designed so that the joining agent processing means 4 can be exchanged thereinto and can thus be coupled to the coating unit 1. This coupling preferably takes place via relative displacement of interface 3 and means 4 such that the means 4 can be exchanged into the interface 3 by being shifted in the direction of height extension h of the coating unit 1. Uncoupling of the joining agent processing means 4 from the interface 3 preferably takes place by a corresponding relative displacement of the parts in the opposite direction. The interface 3 preferably includes terminals for supplying electrical energy to a joining agent processing means 4 coupled thereto. It may also comprise terminals for supplying a means 4 coupled thereto with compressed air or hot air or with electromagnetic energy, laser radiation or other forms of energy. Terminals for controlling the means 4 or any other terminal are also conceivable. The terminals of the interface 3 are preferably not specifically designed for one means, but can rather be used for any joining agent processing means 4 suitable and, in particular, designed for coupling to the interface 3.

The exchangeable joining agent processing means 4, which can be coupled to and uncoupled from the coating unit 1 via the interface 3, has the purpose of processing a joining agent required for joining the coating material 6 to the workpiece surface to be coated. The longitudinal extension l of the means 4 is of the same order as the radial extension r of the carrier 2. Processing of the joining agent occurs via an energy conversion means (not shown) which converts the electrical energy provided via the interface 3 into a form of energy which is required for processing the joining agent. In this first preferred embodiment, the means 4 is designed to provide the so-called "hot melt adhesive joining technology". The energy conversion means of the joining agent processing means 4 includes a heating means (not shown) for converting the electrical energy provided via the interface 3 into thermal energy to liquefy a hot melt adhesive. The joining agent processing means 4 further includes a hot melt adhesive outlet opening 8 which, in the coupled state of the means 4, is arranged approximately level with the pressing rolls 5 and the edge inlet 9 of the coating unit 1. The opening 8 is designed and oriented so that the liquefied hot melt adhesive can be applied therethrough to an edge banding 6 which is fed to the coating unit 1 via the edge inlet 9. Likewise, a design and orientation of the hot melt adhesive outlet opening is conceivable here with which the hot melt adhesive can be applied to the workpiece surface to be coated.

Second Preferred Embodiment

Figure 3:
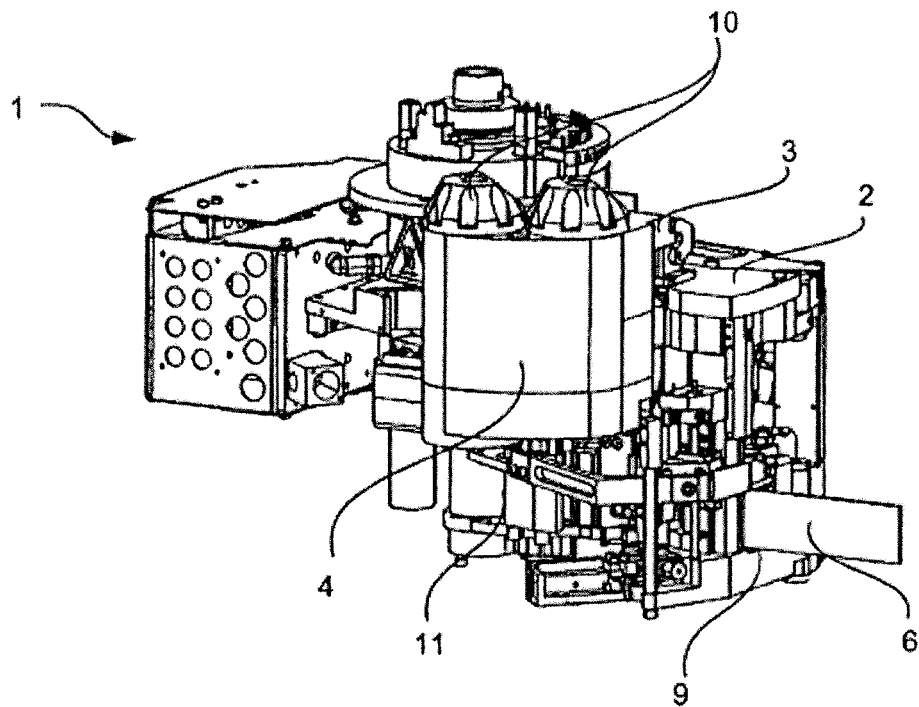
FIG. 3 is a lateral view of the coating unit of a second embodiment of the present invention.
Figure 4:
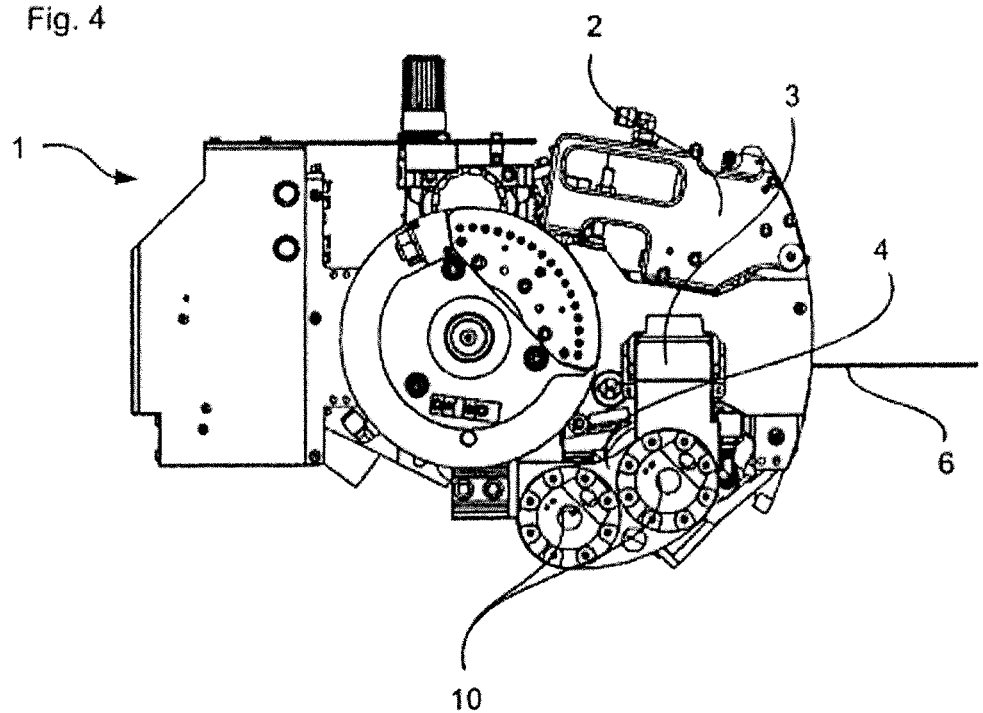
FIG. 4 is a top view of the coating unit of the second embodiment of the present invention.

FIGS. 3 and 4 show a second preferred embodiment of the present invention. This second preferred embodiment is designed identically to the first preferred embodiment, except for the differences described hereinbelow.

The second preferred embodiment differs from the first preferred embodiment in that the joining agent processing means 4 is designed to provide the "hot gas joining technology". For this, the means 4 includes two gas supply terminals 10 which, in the present embodiment, are provided on the upper surface. It should be noted here that these terminals can be arbitrarily positioned, with it being also conceivable for gas to be supplied via the interface 3 of the device carrier 2. In this second preferred embodiment, the energy conversion means (not shown) of the joining agent processing means 4 includes a heating system with which the gas supplied via the gas supply terminals 10 is heated. The heating system of the energy conversion means is supplied with electrical energy via the interface 3. The gas supplied can be gas with an overpressure of, in particular, several bars with respect to its surroundings. Furthermore, the joining agent processing means 4 of the second preferred embodiment includes a hot gas outlet 11 which, in the coupled state of the means 4, is arranged approximately level with the pressing rolls 5 and the edge inlet 9. The hot gas outlet 11 is designed and oriented so that an edge banding 6, which preferably includes a functional layer that develops adhesive properties due to heat input, can be processed or activated by the hot gas exiting the outlet 11. The hot gas outlet 11 can also be designed and oriented so that it can be used to process and/or activate a functional layer on the workpiece and/or a functional layer separately fed to the joining region.

Third Preferred Embodiment

Figure 5:
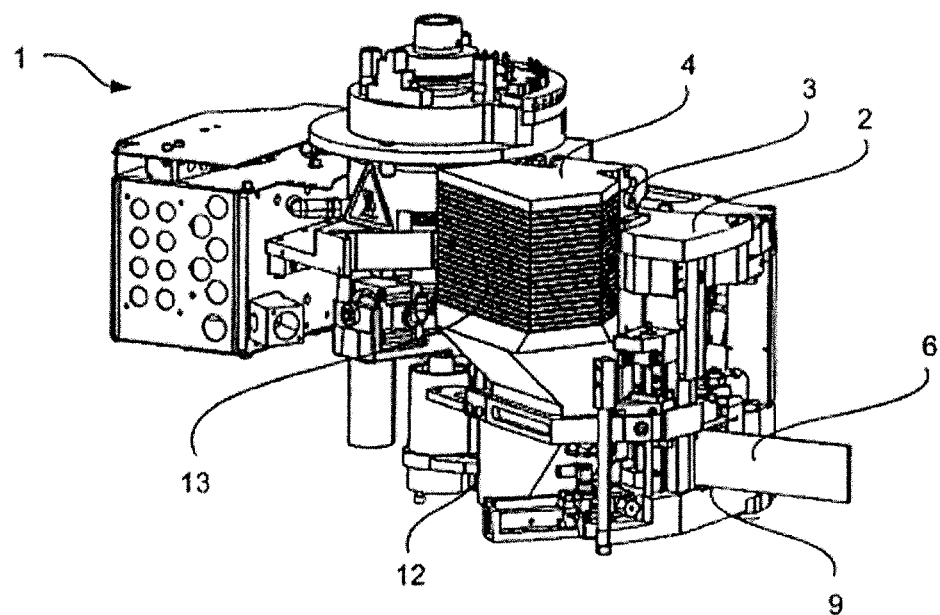
FIG. 5 is a lateral view of the coating unit of a third embodiment of the present invention.
Figure 6:
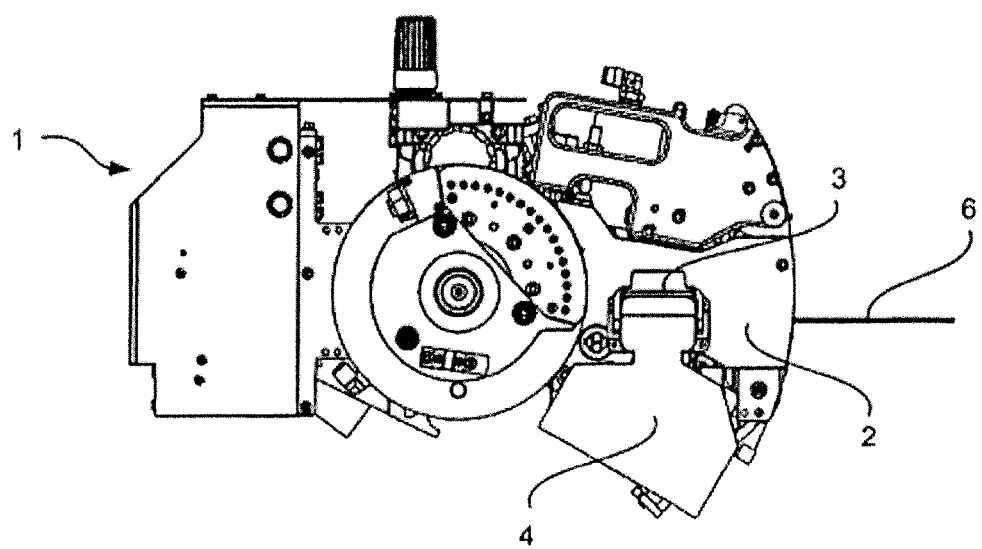
FIG. 6 is a top view of the coating unit of the third embodiment of the present invention.

FIGS. 5 and 6 show a third preferred embodiment of the present invention. This third preferred embodiment is designed identically to the first preferred embodiment, except for the differences described hereinbelow.

Unlike the first preferred embodiment, the third preferred embodiment includes a joining agent processing means 4 which is designed to provide the "laser joining technology". The means 4 of this third preferred embodiment includes an energy conversion means (not shown) comprising a laser diode. By means of this energy conversion means, the energy provided via the interface 3 is converted into electromagnetic radiation in the form of a laser beam. It should be noted here that the energy conversion means may also include several laser diodes. The joining agent processing means 4 further comprises a beam outlet 12 which, in the coupled state of the means 4, is disposed approximately level with the pressing rolls 5 and the edge inlet 9. The beam outlet 12 is designed and oriented so that a functional layer on the edge banding 6 that is supplied to the coating unit 1 via the edge inlet 9 can be processed or activated with the laser beam exiting therefrom. A design and orientation which permits activation of a functional layer on a surface to be coated and/or a functional layer separately fed to the joining area is also conceivable.

In addition, the means 4 has cooling rips 13 designed to passively cool the means 4. It should be noted here that active cooling of the means 4 with a coolant is also conceivable. This can be supplied to the joining agent processing means 4 via terminals on the means 4 and/or via appropriate terminals via the interface 3 of the device carrier 2.

Fourth Preferred Embodiment

Figure 7:
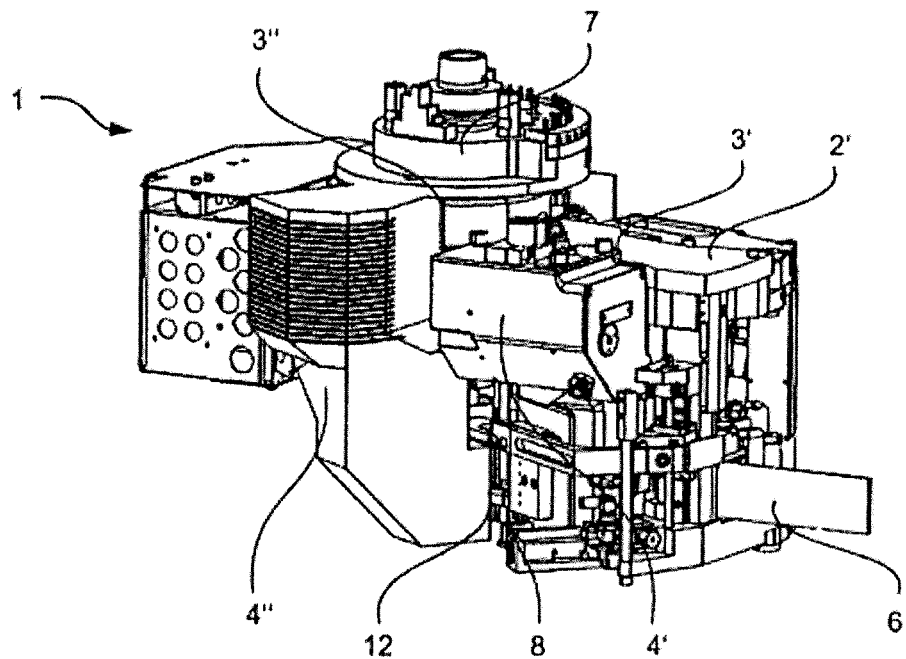
FIG. 7 is a lateral view of the coating unit of a fourth embodiment of the present invention.
Figure 8:
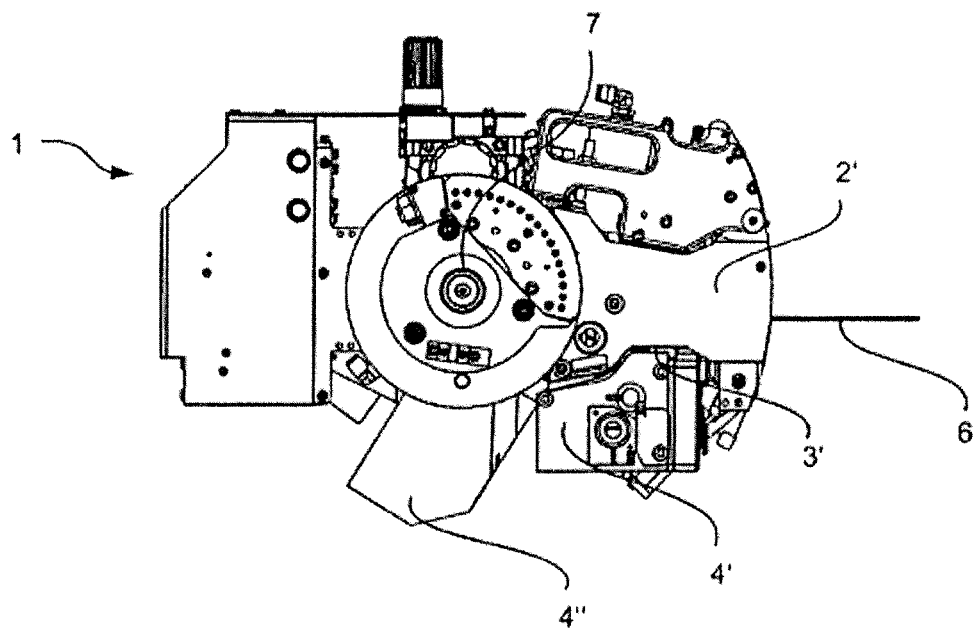
FIG. 8 is a top view of the coating unit of the fourth embodiment of the present invention.

FIGS. 7 and 8 show a fourth preferred embodiment of the present invention. This fourth preferred embodiment is designed identically to the first preferred embodiment, except for the differences described hereinbelow.

According to the fourth preferred embodiment, two different joining technologies are provided on the coating unit 1. The device carrier 2' in this fourth preferred embodiment includes two interfaces 3', 3" that are each designed to accommodate and energize a joining agent processing means. The arrangement of the first interface 3' corresponds to that of the interface 3 which has been described in the context of the first embodiment. The interface 3" is disposed clockwise around the coating unit interface 7, adjoining the first interface 3'. The interfaces 3', 3" correspond to the design of the interface 3 as described in the context of the first preferred embodiment.

The coating unit 1 of this fourth preferred embodiment is designed to provide the "hot melt adhesive joining technology" and the "laser joining technology". The coating unit 1 includes a joining agent processing means 4' which corresponds to the design described in the context of the first preferred embodiment and which is connected to the first interface 3', and a joining agent processing means 4" which corresponds to the design described in the context of the third preferred embodiment and which is connected to the second interface 3". The beam outlet 12 and the hot melt adhesive outlet opening 8 of the means 4' and 4" are preferably designed and oriented so that processing of the edge banding 6 takes place at the same or a similar position as regards both technologies.

Fifth Preferred Embodiment

Figure 9:
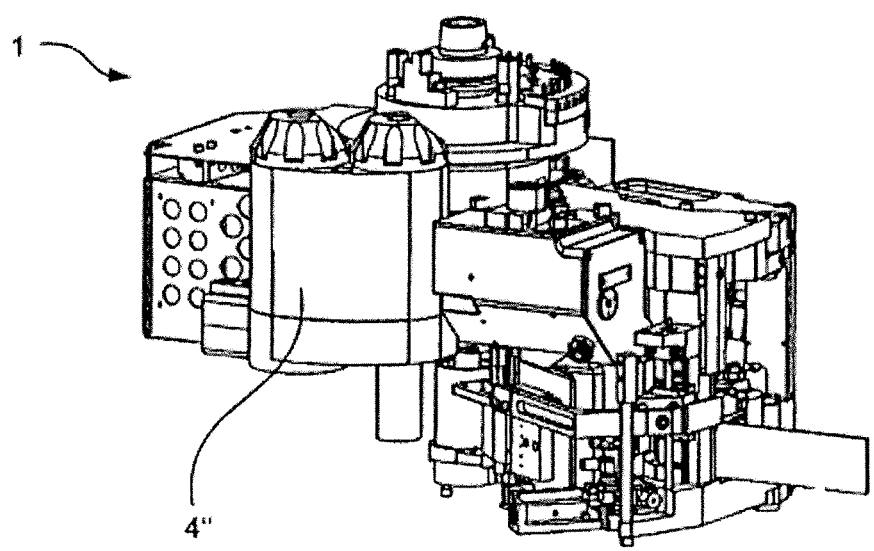
FIG. 9 is a lateral view of the coating unit of a fifth embodiment of the present invention.
Figure 10:
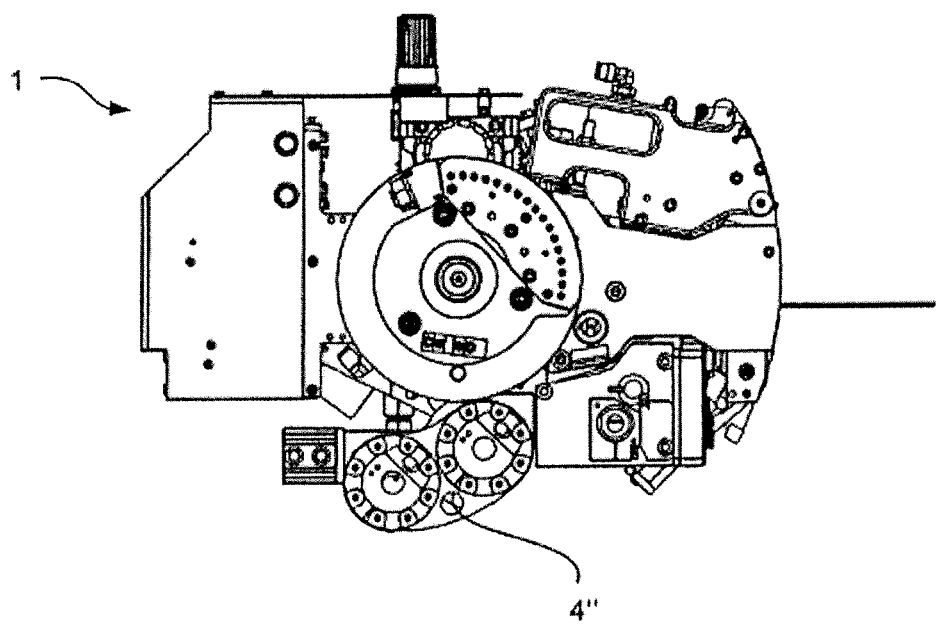
FIG. 10 is a top view of the coating unit of the fifth embodiment of the present invention.

FIGS. 9 and 10 show a fifth preferred embodiment of the present invention that is designed identically to the fourth preferred embodiment, except for the differences described hereinbelow.

Unlike the fourth preferred embodiment, the joining agent processing means 4" of the fifth preferred embodiment is designed to provide the "hot gas joining technology". The joining agent processing means 4" is designed analogously to that of the second preferred embodiment.

Sixth Preferred Embodiment

Figure 11:
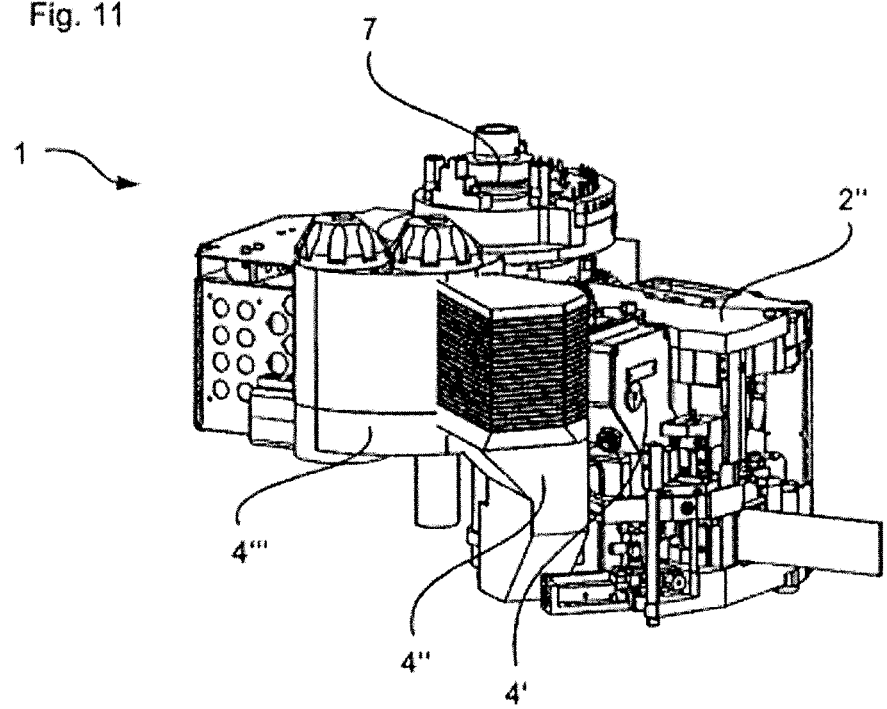
FIG. 11 is a lateral view of the coating unit of a sixth embodiment of the present invention.
Figure 12:
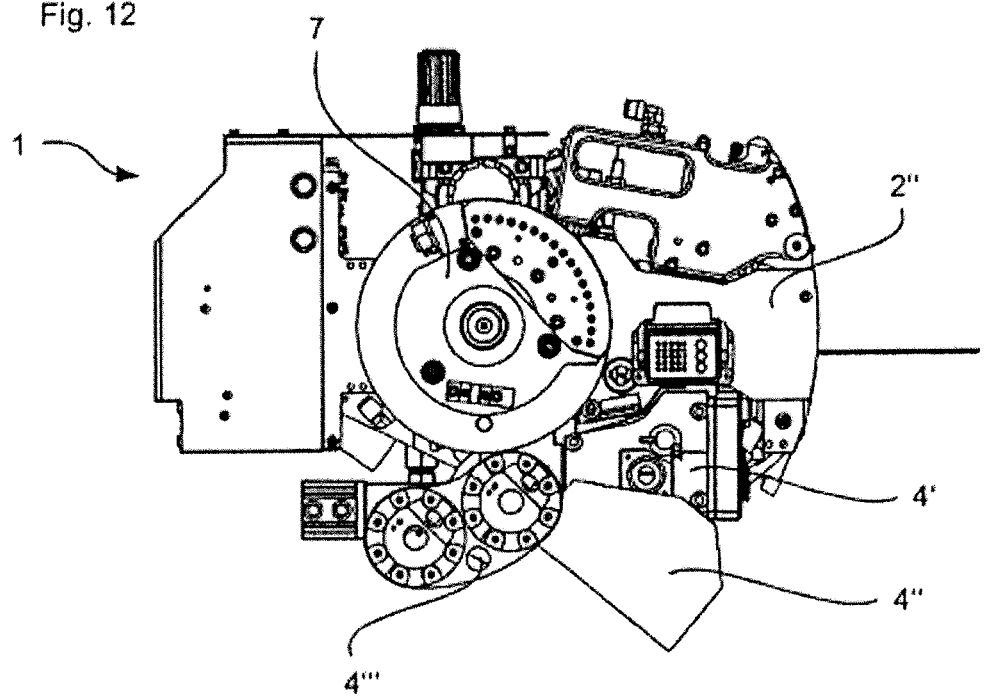
FIG. 12 is a top view of the coating unit of the sixth embodiment of the present invention.

FIGS. 11 and 12 show a sixth preferred embodiment of the present invention. The design of this sixth preferred embodiment corresponds to that of the first preferred embodiment, except for the differences described hereinbelow.

The coating unit 1 of this sixth embodiment is designed to provide all three previously described joining technologies—the "hot melt adhesive joining technology", the "laser joining technology" and the "hot gas joining technology", to be precise.

As compared to the first three embodiments, the device carrier 2" of this sixth preferred embodiment includes a second and third interface for accommodating and energizing a joining agent processing means. The interfaces are designed analogously to that of the first embodiment. In this sixth preferred embodiment, the three joining agent processing means are disposed clockwise around the coating unit interface 7 in an order such that the "laser joining technology" means 4" is disposed so as to follow the "hot melt adhesive joining technology" means 4' and to precede the "hot gas joining technology" means 4'''. The individual means 4', 4", 4''' are designed analogously to the corresponding means in the previously described embodiments. Furthermore, the means are designed and/or oriented so that their outlet openings, and more precisely the hot melt adhesive outlet opening, the hot gas outlet and the beam outlet, are disposed in the same region, as a result of which processing of the edge banding takes place in each case at the same or a similar position.

The invention claimed is:

1. A coating unit for a coating machine for coating plate-shaped or strip-shaped workpieces containing at least sections, of wood, wood materials, and plastic, with a coating material, the coating unit comprising:
   a first interface for accommodating and energizing an exchangeable joining agent processing element,
   a second interface for accommodating and energizing an additional exchangeable joining agent processing element, and
   a coating unit interface for exchangeably coupling the coating unit to a coating machine, wherein the first interface and the second interface are fixedly disposed on, and circumferentially separated around the coating unit interface, and
   wherein the exchangeable joining agent processing element and the additional exchangeable joining agent processing element are configured to be exchanged into the first and second interface respectively,
   wherein the exchangeable joining agent processing element and the additional exchangeable joining agent processing element each comprises an energy conversion element,
   wherein the energy conversion element of the exchangeable joining agent processing element is configured for converting first energy provided via the first interface to process a first joining agent for joining the coating material, and
   wherein the energy conversion element of the additional exchangeable joining agent processing element is configured for converting second energy provided via the second interface to process a second joining agent for joining the coating material.

2. The coating unit according to claim 1, wherein the exchangeable joining agent processing element further comprises an adhesive reservoir for receiving an adhesive and an application element for applying the adhesive to the coating material and/or a workpiece surface to be coated and is adapted to activate the adhesive by the energy conversion element of the exchangeable joining agent processing element.

3. The coating unit according to claim 2, wherein the additional exchangeable joining agent processing element is adapted to activate a functional layer activatable by an energy input to join the coating material to the workpiece surface to be coated.

4. The coating unit according to claim 3, wherein the energy conversion element of the additional exchangeable joining agent processing element comprises at least one laser diode for generating a laser beam and further comprises a beam guiding and/or beam shaping element for the laser beam.

5. The coating unit according to claim 1, wherein the energy conversion element of the exchangeable joining agent processing element comprises a heating system for generating hot gas and includes a nozzle for the hot gas.

6. The coating unit according to claim 1, further comprising a pressing member for pressing the coating material against a workpiece surface to be coated.

7. A coating device for coating plate-shaped or strip-shaped workpieces which comprise at least in sections, wood, wood materials, plastic or the like, with a coating material, wherein said coating device comprises the coating unit according to claim 1 and further comprises:
   a feeder for feeding a coating material to a workpiece surface to be coated,
   a pressing member for pressing the coating material against the workpiece surface to be coated, and
   a conveyor for causing relative movement between the pressing member and the workpiece surface to be coated.

8. The coating device according to claim 7, wherein the coating device comprises an exchange element for setting up the coating unit for the exchangeable joining agent processing element and the additional exchangeable joining agent processing element and for changing the coating unit over to another joining agent processing element.

* * * * *